United States Patent [19]
Bartlett

[11] 3,721,281
[45] March 20, 1973

[54] STUMP SPLITTER

[76] Inventor: Raymond H. Bartlett, 604 N.W. Overlook Drive, Vancouver, Wash. 98665

[22] Filed: Sept. 27, 1971

[21] Appl. No.: 184,075

[52] U.S. Cl. .............................. 144/2 N, 144/193 A
[51] Int. Cl. ..................................... A01g 23/06
[58] Field of Search ...................... 144/2 N, 2 R, 193

[56] References Cited

UNITED STATES PATENTS

| | | | |
|---|---|---|---|
| 2,820,493 | 1/1958 | Davis | 144/2 N |
| 3,376,907 | 4/1968 | McNeal | 144/2 N |
| 3,620,271 | 11/1971 | Loyer | 144/2 N |

*Primary Examiner*—Donald R. Schran
*Attorney*—L. R. Geisler

[57] ABSTRACT

The splitting device is mounted on and operated from a tractor or other ground vehicle and includes an extending frame which can be raised, lowered or tipped. The frame rotatably supports an inverted U-shaped yoke member at its outer end. A pair of arms hingedly supported within the top of the yoke member are formed with opposed slicing blades at their lower ends. A pair of double-acting hydraulic cylinders at the bottom ends of the sides of the yoke member are connected to the bottom ends of the arms respectively. Hydraulic means for moving the arms and therewith the blades toward and away from each other, for rotating the yoke member, and for raising, lowering or tipping the frame supporting the yoke member, are operated from the vehicle.

7 Claims, 6 Drawing Figures

RAYMOND H. BARTLETT
INVENTOR.

BY *F. R. Geisler*
ATTY.

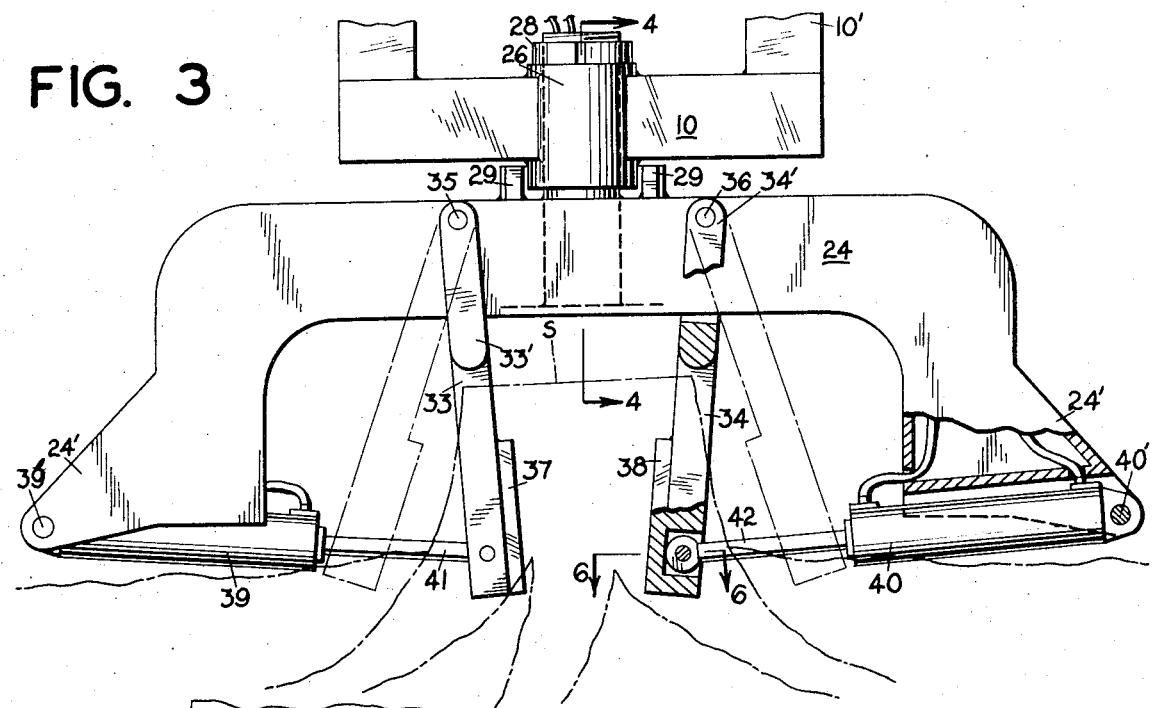
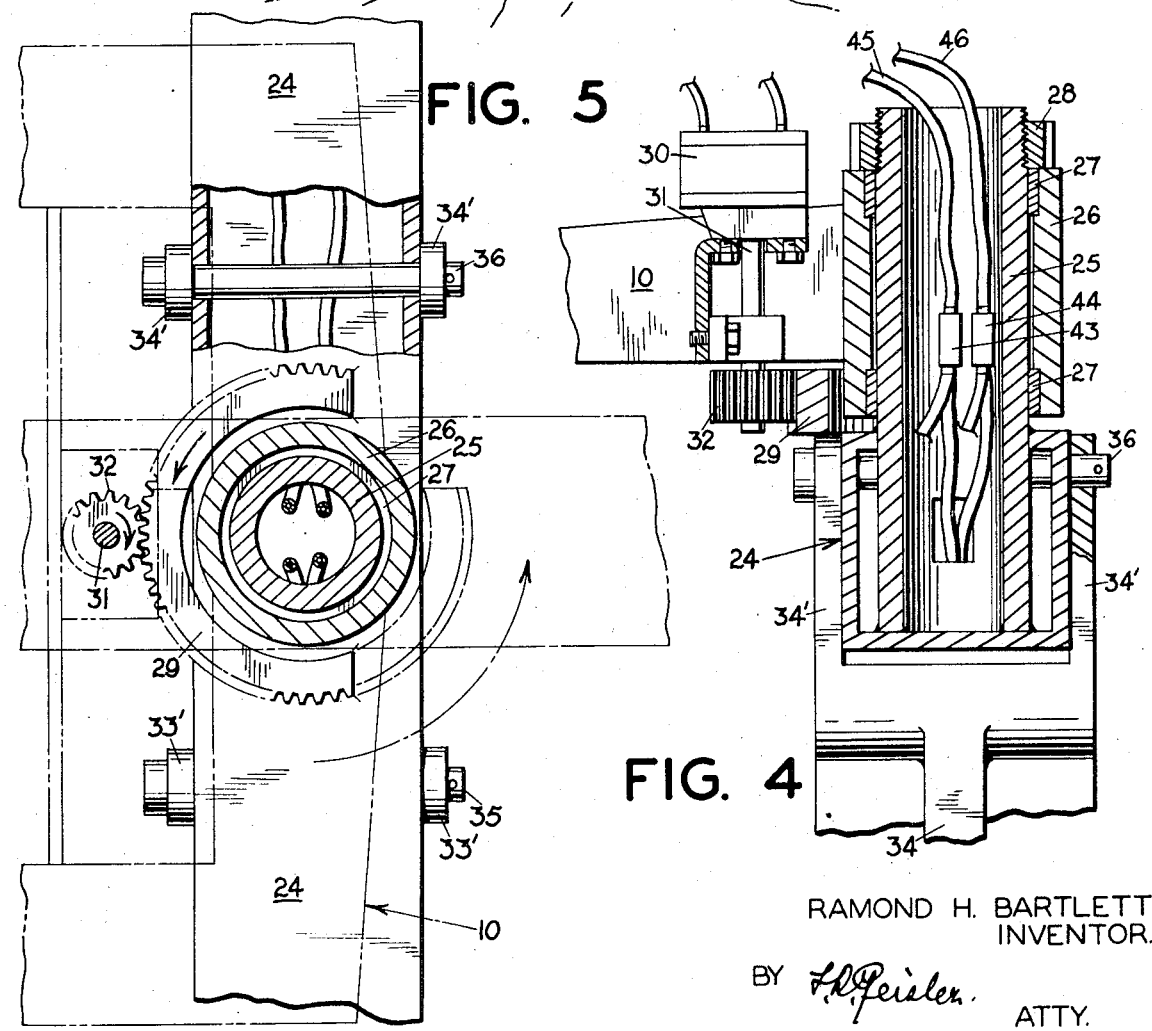

STUMP SPLITTER

BACKGROUND OF THE INVENTION

A current problem being encountered in the grading and building of new roads, for example over land from which large trees are removed, is the problem of disposing of the stump of a large tree where the stump is too large to be bulldozed out or removed by ordinary stump pullers. The use of dynamite in blasting out large stumps or portions thereof is not possible in some localities and, furthermore, is relatively expensive and is hazardous if done by unskilled persons. It has been found that if a stump can be split into sections along the substantially vertical grain lines, then the pulling out of each split section, together with the relative portion of the stump root attached to such section, can be done separately without much difficulty by well-known means, as, for example, by a heavy tractor equipped with chain and grappling hooks.

U.S. Pat. No. 1,663,277, issued Mar. 20, 1928, describes a device in which a weight carrying a splitting blade at the bottom is raised repeatedly above a stump and allowed to drop onto the stump in order to split the stump. This device requires a specially constructed carrier and obviously the splitting of a large stump by this means at best would involve considerable expenditure of time and would not be practical where the stump is located on sloping ground. U.S. Pat. No. 2,157,483, issued May 9, 1939, describes a device designed to split a stump along its substantially vertical grain lines by the use of spaced arms, pivotally connected at their outer ends, carrying opposed splitting elements immediate their ends, and having mechanical means provided at the inner ends for moving these ends of the arms toward and away from each other. The movement of the arms is produced by mechanical means on a specially constructed vehicle.

The object of the present invention in brief is to provide more practical means and hydraulically operated means for splitting a stump and also means capable of being mounted on an ordinary tractor or ground-working vehicle, from which vehicle a pair of opposed splitting blades can be positioned and manipulated and caused to perform the desired stump-splitting action in an effective and efficient manner.

SUMMARY OF THE INVENTION

A pair of articulated arm assemblies capable of being mounted respectively on opposite sides of a tractor, extending forwardly from the tractor, and operated by hydraulic cylinders on the tractor, support a header at their forward ends. A yoke member, in the shape of an inverted U, is supported at its center from the header for partial rotation, its rotation being controlled by gear connection with a hydraulic motor on the header, which motor is operated from the tractor.

The identical downwardly-extending portions at each side of the yoke member are spaced a sufficient distance apart so that they can be positioned on opposite sides of a stump to be split with sufficient space in between them and the stump for the splitting blades which are formed on arms suspended from the top portion of the yoke member. The bottom ends of the arms with the splitting blades are connected to the downwardly-extending portions of the yoke member by hydraulic cylinder assemblies which operate in unison in opposite directions and are also controlled from the tractor.

BRIEF DESCRIPTION OF THE DRAWINGS

In the drawings:

FIG. 3 is a fragmentary front elevation of the splitter drawn to a larger scale, showing the yoke member positioned transversely with respect to the longitudinal center line of the tractor (and thus taken from the right of the full line position of the yoke member in FIG. 1), the tractor and supporting assemblies being omitted from the figure, and with portions of the yoke member and the arms carrying the splitting blades being broken away and shown in section for clarity; the stump in the process of being split being indicated in broken lines, and the withdrawn position of the arms and splitting blades shown in broken lines;

FIG. 4 is a fragmentary section taken on line 4—4 of FIG. 3, drawn to a larger scale;

FIG. 5 is a fragmentary section on line 5—5 of FIG. 1, drawn to the same scale as FIG. 4.

In FIGS. 1 and 2, the tractor on which the splitting device is mounted and from which it is operated is indicated by the reference character T. The device includes a header, indicated in general by the reference 10 which is shaped substantially as shown in the drawings. This header is formed of welded steel plates with a raised rear portion 10' on each side. The supporting pairs of articulated arm assemblies by which the splitting device is mounted on the tractor are connected respectively to the two rear portions 10' of the header. The two articulated arm assemblies for the header are identical. Only the near side assembly is shown in FIGS. 1 and 2, and it will suffice to describe this near side assembly shown.

Figure 1:
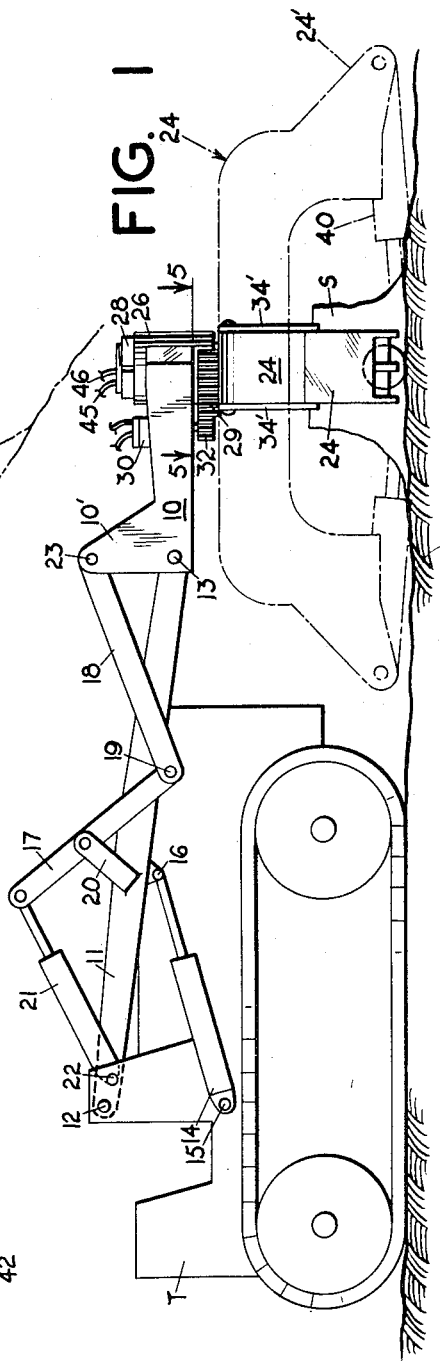
FIG. 1 is a side elevation showing the splitter mounted on a caterpillar-type tractor and performing the splitting operation on a stump, the yoke member, with the splitting blades, being shown in full line as positioned transversely with respect to the longitudinal center line of the tractor, and shown in broken lines as rotated 90° for performing a second or crosswise splitting action on the stump.

A main arm 11 (FIGS. 1 and 2) has its rear end hingedly mounted at 12 on the upper portion of a housing on the tractor, and has its forward end hingedly connected to the header at 13. A double-acting hydraulic cylinder 14 is pivotally mounted at 15 on the tractor and the end of its piston rod is pivotally connected at 16 to an ear on the underside of the main arm 11. Thus the operation of the hydraulic cylinder 14 for the supporting arm 11 in each pair of the articulated arm assemblies can cause the front end of the arm and therewith the header 10 to be raised or lowered with respect to the tractor.

Each articulated arm assembly include a pair of arms 17 and 18 pivotally connected together at 19. The first arm 17 of the pair is pivotally mounted near its center on a bracket 20 secured on the corresponding main arm 11. The rear end of this first arm 17 is pivotally connected to the piston rod the double-acting hydraulic cylinder 21 which is pivotally mounted on the tractor at 22. The front end of the second arm 18 is pivotally connected at 23 to the top of the corresponding raised portion 10' of the header 10. It will be apparent from this brief description with respect to FIGS. 1 and 2 that, with the operation of the two hydraulic cylinders 14 and 21 in each of the pair of articulated arm assemblies, the header member 10 of the device not only can be raised or lowered, but also can be tilted upwardly or downwardly as required and as illustrated in part in FIG. 2.

Figure 2:
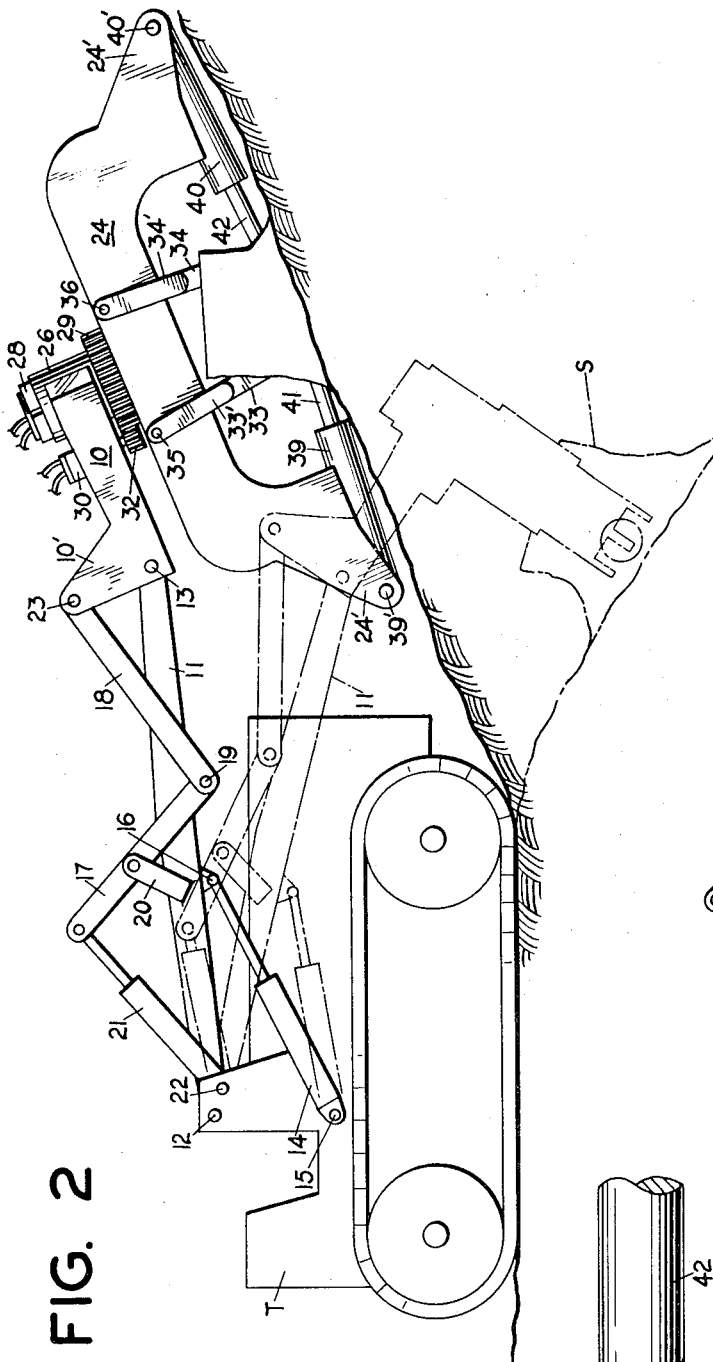
FIG. 2 is a similar side elevation illustrating in full lines one position of the splitter in the performing of the splitting action on a stump located on a ground surface sloping upwardly from the ground on which the tractor is resting, and illustrating in broken lines another position of the splitter in the performance of the splitting action on a stump located on a ground surface sloping downwardly from the ground on which the tractor is resting, and with the yoke member with the splitting blades shown rotated 90° for the purpose of further illustration.

A hollow composite, inverted, substantially U-shaped member indicated in general by the reference 24, which for lack of a better term I designate as the yoke member, is rotatably supported from the forward portion of the header 10. The hollow yoke member is formed of heavy welded steel plates and is shaped preferably approximately as shown in FIGS. 1, 2 and 3, having two identical, downwardly-extending side portions 24' which are spaced apart a sufficient distance to enable them to span any stump to be split with clearance enough to accommodate the splitting blades, later described, on opposite sides of the stump when the yoke member is set down over the stump. In FIGS. 1, 2 and 3 the yoke member is shown in position for splitting a stump, the stump being indicated by the reference S.

FIGS. 4 and 5 show a preferred simple arrangement for rotatably supporting the yoke member 24 from the header 10. A cylindrical neck 25, having its bottom portion welded in the center of the top portion of the yoke member 24, extends up from the yoke member through a cylindrical mounting support cylinder 26 welded on the header 10. Suitable bearings, indicated at 27 in FIG. 4, are provided for the neck 25 in the support cylinder 26, and the extending top end of the neck is provided with a nut 28.

A partial gear ring 29, extending for at least 180°, is welded on the top of the yoke member 24, spaced from, but co-axial with, the bottom of the support cylinder 26. A reversible hydraulic motor 30 (FIG. 4), mounted on the header 10 near the mounting support cylinder 26 for the yoke member, drives a downwardly-extending shaft 31. A gear wheel 32, secured to the bottom end of the shaft 31 below the header 10, meshes with the peripheral teeth on the gear ring 29. Thus operation of the motor 30 will cause the yoke member 24 to be turned with respect to the header and with respect to the tractor T.

A pair of downwardly-extending, blade-carrying arms 33 and 34 are supported on the upper portion of the yoke member 24 at equal distances respectively from the center of rotation of the yoke member. The upper halves of these arms are bifurcated to form pairs of mounts 33',33' and 34'.34' respectively overlying opposite faces of the yoke member, and are pivotally mounted on the corresponding ends of supporting shafts 35 and 36 respectively extending transversely through the top portion of the yoke member (FIGS. 3, 4 and 5). The lower ends of hese arms 33 and 34 are formed with opposed splitting blades 37 and 38 respectively (FIG. 3).

Figure 6:
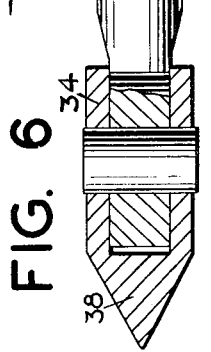
FIG. 6 is a fragmentary section through one of the splitting blade arms taken on line 6—6 of FIG. 2, drawn to an enlarged scale.

A pair of identical, double-acting hydraulic cylinders 39 and 40 (shown best in FIG. 3) have their outer ends pivotally supported on cross shafts 39' and 40' mounted respectively in the bottom outer ends of the downwardly-extending side portions 24' of the yoke member. These cylinders operate piston rods 41 and 42 respectively, the outer ends of which are pivotally connected respectively to the arms 33 and 34 (see also FIG. 6). The hydraulic cylinders 39 and 40 are so arranged that they will always operate in unison in opposite direction, and consequently actuation of these cylinders will result in the arms 33 and 34, with their opposed splitting blades, moving either towards or away from each other as the case may be. The pair of hydraulic tubes leading to the outer ends of these two cylinders, and the pair of tubes leading to their opposite inner ends, are connected to a pair of headers 43 and 44 (FIG. 4) to which the hydraulic lines 45 and 46 lead respectively from hydraulic controls on the tractor. This arrangement insures the desired operation of the arms and splitting blades always in unison in opposite directions.

The controls for the hydraulic lines 45 and 46 operating the splitting blades, the controls for the two hydraulic lines leading to the hydraulic motor 30, and the controls for the two hydraulic cylinders 14 and 21 in each of the articulated arm assemblies, are not shown and need not be described since multiple hydraulic controls capable of being employed in connection with a central hydraulic power system are old and well-known in the art and the installation of such controls on a tractor, for example, has been found to present no particular problem.

The manner in which the splitter is operated in order to perform the desired splitting of a stump will be readily understood from FIGS. 1, 2 and 3 and the foregoing brief description. With the splitter mounted on the tractor in the manner illustrated, and with the header and yoke member in raised position, the operator on the tractor moves the tractor into the necessary proximity to the stump to be split. The pair of articulated arm assemblies are then operated to bring the header 10, and therewith the yoke member 24, into position over the stump so that the yoke member straddles the stump in one position or another. Due to the maneuverability of the header, and therewith of the yoke member, (as illustrated in FIG. 2), the stump can be straddled regardless of the nature of the ground on which the stump is located. This is an important feature of the invention.

When the yoke member is properly positioned over the stump the hydraulic cylinders controlling the splitting blades are actuated to cause the blades to move toward each other and into opposite sides of the stump, producing a splitting action lengthwise of the wood grain of the stump. The splitting blades are then withdrawn and the yoke member is given a partial rotation, and the splitting blades are again operated.

Generally two splitting operations, approximately at 90° with respect to each other, will be sufficient. However, if necessary, more splitting actions at less angularity with respect to each other can be performed to reduce the stump into smaller sections. When sufficient splitting of the stump has been accomplished the splitter is raised and moved from the spot and the sections of the stump, with their respective root portions, can be pulled out of the ground by means usually employed for such purposes.

The fact that the splitter can be installed on an ordinary tractor as described, the fact that it can be operated entirely from the tractor by the tractor operator, and the fact that the entire stump splitting operation can be done with a minimum expenditure of time and labor are further important features.

I claim:

1. A stump splitter including a vehicle, an inverted substantially U-shaped yoke member, adjustable supporting means for said yoke member mounted on and extending from said vehicle, said yoke member extending downwardly from the outer end portion of said supporting means, a pair of opposite, downwardly-extending side portions in said yoke member, a pair of movable opposed splitting blade arms mounted in said yoke member, operating means for said splitting blade arms in said side portions of said yoke member connected with said splitting blade arms respectively, said side portions of said yoke member spaced apart a sufficient distance to enable said yoke member and splitting blade arms to span a stump to be split, whereby when said yoke member is set in straddling position over a stump, the operation of said splitting blade arms against opposite sides of the stump respectively will exert a splitting force on the stump.

2. The stump splitter of claim 1 with said supporting means for said yoke member comprising a pair of articulated arm assemblies having a header at their outer end, said arm assemblies so arranged that said header may be raised or lowered and tilted upwardly or downwardly with respect to said vehicle.

3. The stump splitter of claim 2 with the addition of hydraulic means mounted on said vehicle for adjusting said arm assemblies and therewith said header.

4. The stump splitter of claim 2 with said yoke member rotatably supported from said header.

5. The stump splitter of claim 4 with the addition of hydraulic means on said header operated from said vehicle for rotating said yoke member.

6. The stump splitter of claim 1 with said splitting blade arms hingedly mounted within the top of said yoke member and extending downwardly, and with said operating means for said splitting blade arms comprising a pair of hydraulic cylinder assemblies supported in the bottoms of said side portions of said yoke member respectively.

7. The stump splitter of claim 6 with the pair of hydraulic cylinder assemblies in the bottoms of said side portions of said yoke member arranged to operate in unison in opposite directions and with their operation controlled from said vehicle.

* * * * *